INVENTORS
THOMAS A. WYATT
COLLIE C. WYATT
RUE T. WYATT
BY Leech + Radue
Attorneys Dec. 12, 1950 T. A. WYATT ET AL 2,534,156
LOADING AND UNLOADING DEVICE FOR VEHICLE BODIES
Filed Dec. 16, 1948 4 Sheets-Sheet 4
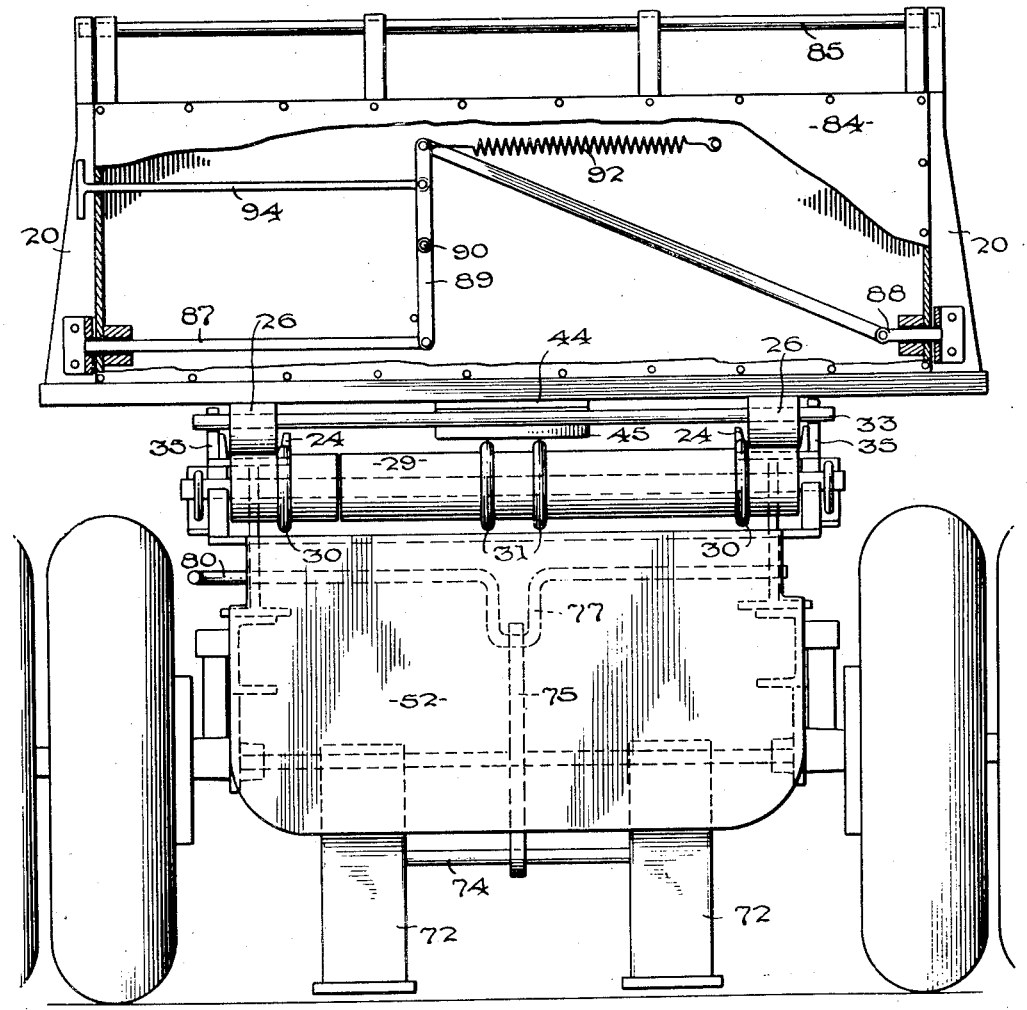
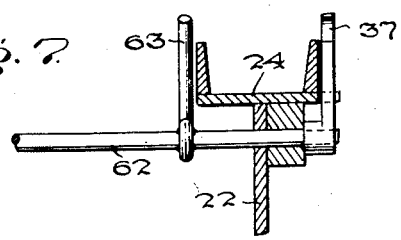
INVENTORS
THOMAS A. WYATT
COLLIE C. WYATT
RUE T. WYATT
BY Leech & Radue
Attorneys Patented Dec. 12, 1950

2,534,156

UNITED STATES PATENT OFFICE 2,534,156

LOADING AND UNLOADING DEVICE FOR VEHICLE BODIES

Thomas A. Wyatt, Collie C. Wyatt, and Rue T. Wyatt, Tyler, Tex.

Application December 16, 1948, Serial No. 65,674

8 Claims. (Cl. 214—84)

This invention relates generally to loading and unloading devices for vehicle bodies and more particularly to an apparatus which may be readily attached as a unit to conventional truck chassis of many types to permit the loading for hauling of one type of truck body while similar or other type bodies for the same chassis are being loaded or unloaded with freight of various kinds.

In the past, attempts have been made to provide devices for vehicles which will function broadly in the manner indicated but, in general, these have been characterized by impracticality, complicated operation, unwieldiness, and excessive cost of purchase and maintenance.

Accordingly, the chief object of the present invention is to obviate the disadvantages of prior art structures and to provide a simple practical apparatus which is readily attachable as a unit to truck chassis to effect a loading or unloading of truck bodies thereto or from.

Another important object of the present invention is to provide a body loading and unloading apparatus for vehicle chassis including means for automatically guiding and locking bodies in place thereon.

Another important object of the invention is to provide an apparatus for attachment to the chassis of a winch equipped truck to effect a ready lowering of a truck body therefrom or a raising of a body to the bed thereof.

A further important object of the invention is to provide in a device of the type described, power means for initially moving a truck body rearwardly of a truck chassis until gravity takes over during the unloading operation of the truck body.

Another object of the invention is to provide means whereby in an apparatus of the type described, the loading of a truck body automatically positions the power means for proper operation for the next unloading operation.

Other objects and advantages of the present invention will become apparent during the course of the following description.

In the drawings there is shown one embodiment of the invention. In this showing:

Fig. 4 is a bottom plan view to a reduced scale of a truck body equipped with a portion of the apparatus comprising the invention;

Fig. 5 is a fragmentary side elevational view to an enlarged scale of the means for locking a truck body in place upon a truck chassis;

Fig. 6 is a rear elevational view of the truck body in position upon the truck chassis showing the auxiliary supporting shoes and various details of the apparatus; and Fig. 7 is a detailed sectional view to enlarged scale of a portion of the locking apparatus of the invention.

Figure 1:
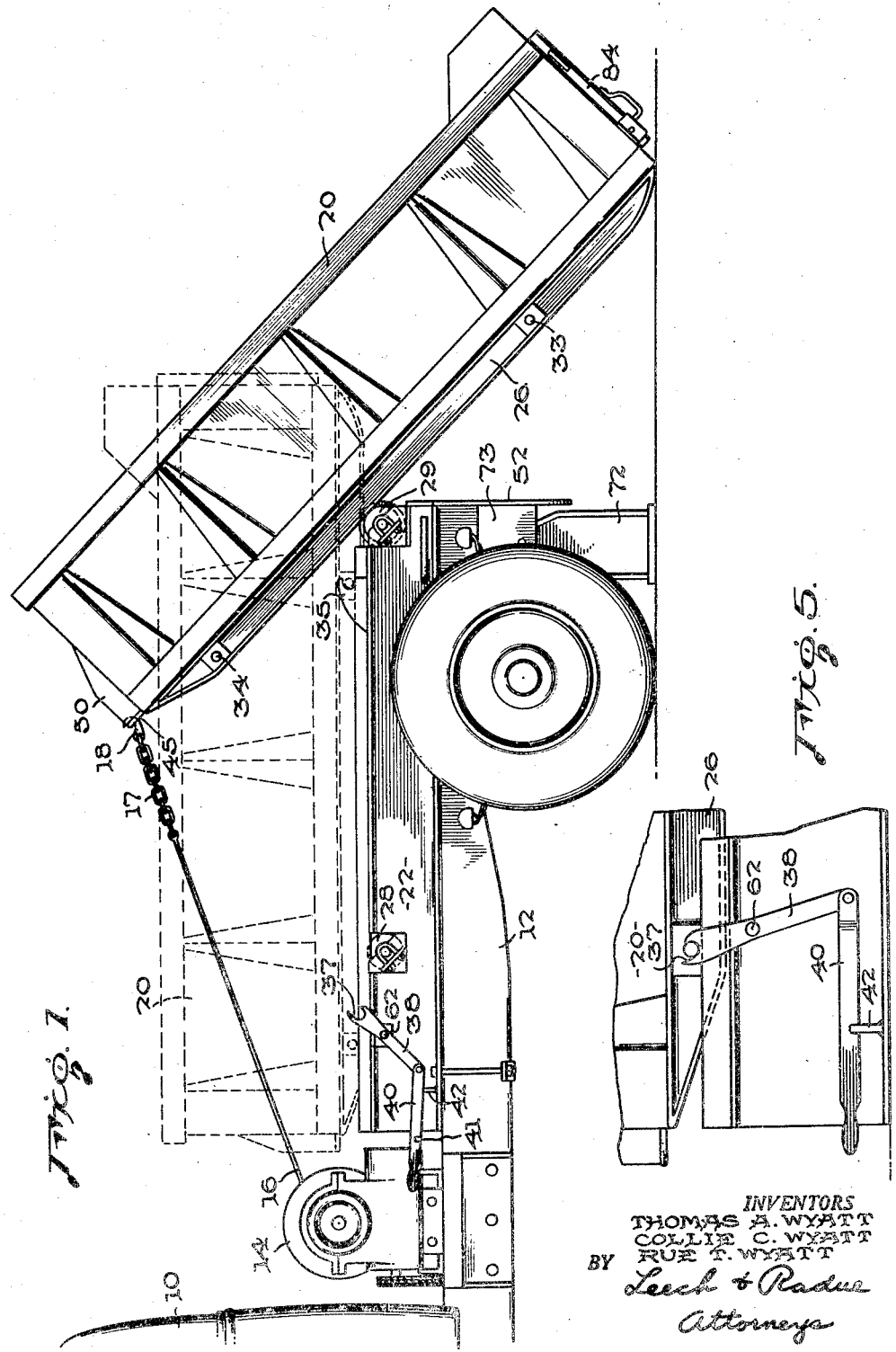
Fig. 1 is a view and side elevation of a truck body being unloaded from a truck chassis in accordance with the invention.

Referring to the drawings, numeral 10 designates the cab of a truck having a chassis 12 and being equipped with a power operated winch 14 and its cable 16. The end of the cable 16 is preferably connected with a chain section 17 terminating in a hook 18 for reasons which will become apparent.

The truck is provided with a load carrying body 20 which may be of any desired type, a dump truck body being illustrated in the drawings.

The apparatus forming the present invention comprises a rigid frame structure 22 having suitable lateral connecting members 23 which frame is suitably and rigidly connected to the vehicle chassis 12. The upper surfaces of the longitudinally extending frame members 22 comprise channel members forming a pair of tracks 24 which are adapted to slidably receive a pair of spaced runners 26 which are rigidly secured to the bottom of the truck body 20. At the forward or cab end of the chassis, a pair of runner supporting rollers 28 are mounted on a shaft suitably journalled in the longitudinal frame members 22 and the tracks 24, being cut away at this point, the upper surfaces of the rollers 28 project slightly above the track surfaces 24 so as to furnish rolling support for the runners 26 during loading and unloading operations.

A single laterally extending roller 29 is also suitably journaled on a shaft at the rear end of the frame members 22 and is provided with a pair of outer peripheral runner guiding flanges 30 and a pair of inner cable and chain guiding peripheral flanges 31. It will be readily apparent that the weight of the truck body when mounted on the frame 22 will be supported by the rollers 28 and 29, the roller 29 being divided as shown.

Figure 2:
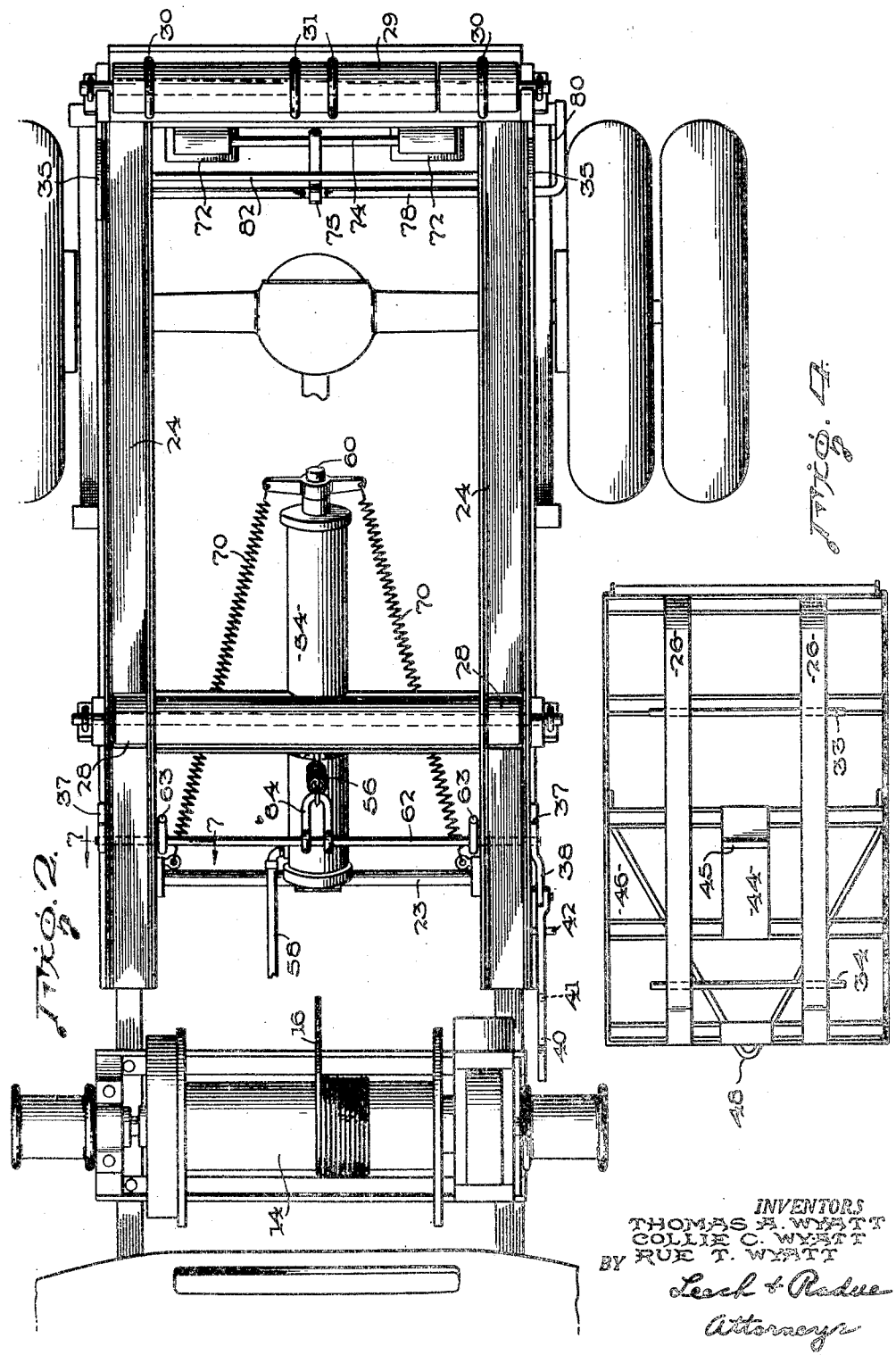
Fig. 2 is a view in plan of a portion of the apparatus comprising the present invention.
Figure 3:
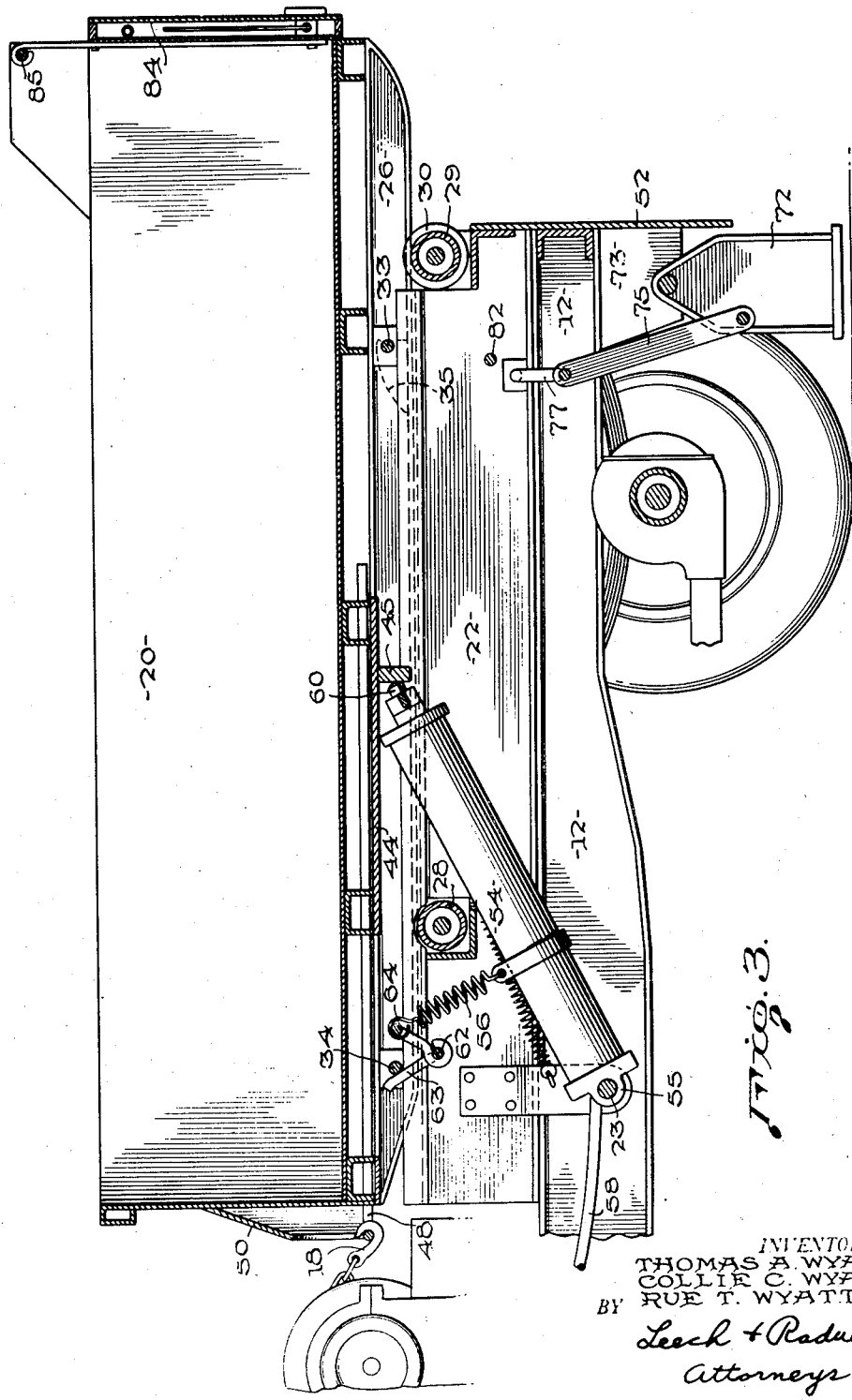
Fig. 3 is a view and side elevation of the truck body locked in position upon a truck chassis but ready to be unloaded therefrom.

The runners 26 which are fixed to the truck body are tapered at their ends (Fig. 1) and are connected by a pair of rods 33 and 34 which extend therethrough and somewhat beyond (Figs. 1, 3 and 4). The ends of the rod 33 are adapted, when the body is mounted on the frame of the apparatus forming the present invention, to engage a pair of hook-shaped stop members 35 (Figs. 1, 2 and 3) which are fixed to the sides of the surface of the tracks 24 to limit forward movement of the body. The stop members 35 also hold the body down on frame 22. The ends of the rod 34 during loading of the truck upon the frame 22 engage the hook portions 37 (Figs. 1 and 5) of a pair of spaced arms 38 which are pivotally connected to an operating lever 40 having a slot 41 which is adapted to be latched over an upstanding lug 42. The engagement of the ends of the rods 34 with the hook portions 37 during loading of the body upon the chassis attachment 22 swings the arms 38 and 40 rearwardly (Fig. 5) to securely lock the body 20 on the frame 22.

In addition to the runners 26, the bottom of the truck body 20 is provided with a centrally located longitudinally extending plate 44 (Figs. 3 and 4) provided with a laterally extending downwardly projecting flange 45 for a purpose to be explained. A V-shaped rod 46 is also secured to the bottom of the truck body and its forwardmost portion forms a ring or loop 48 which is adapted to be engaged by the cable hook 18 and which is protected from engagement with the rear of the frame 22 by a guard 50, the upper portion of which is tapered to incline upwardly toward the front end surface of the body. During the loading of the body upon the frame 22, the guard 50 engages a depending butt plate 52 which is welded across the rear end of the frame 22 and prevents damage to the ring 48.

The frame 22 in approximate vertical alignment with the rearward side of roller 29 is provided with a cylinder 54 pivotally mounted thereto as at 55 (Figs. 2 and 3) and supported in an inclined position by means of a heavy tension spring 56. Air enters the cylinder 54 by means of a conduit 58 from a suitable source of pressure and the outer end 60 of the piston rod is adapted to engage the flange 45 of the plate 44. The rod or shaft 62 upon which the locking arms 38 are mounted, also has fixed thereto a pair of spaced trigger members 63 and a U-shaped centrally positioned member 64 from which the upper end of the tension spring 56 depends. The members 63 and member 64 are angularly spaced less than a right angle. This may be termed a crank angle relation.

It will be readily apparent that the admission of air to the cylinder 54 will cause the piston rod 60 to exert rearwardly directed pressure on the flange 45 to move the dump body 20 rearwardly in the tracks 24 on the rollers 28 and 29. Furthermore, the rearward motion of the rod 34 will engage the spring supporting member 64 to swing it downwardly and thus lower and change the angular position of the cylinder 54. The member 64 being fixed to the shaft 62 rotates the latter to simultaneously release the rod 34 from the hook portion 37 of the locking arm 38, the handle of the locking arm 40 having first been raised to unlatch the lug 42 from the notch 41. The admission of air to the cylinder having been cut off upon the completion of the unloading process, the piston rod 60 is retracted into the cylinder 54 by means of a pair of tension springs 70.

Conversely, when the truck body 20 is being loaded onto the frame 22, forward motion of the rod 34 will engage the trigger members 63 simultaneously with its engagement with the hook portions 37 to rotate the rod 62 counterclockwise as seen in Figs. 1 and 3. Thus, the counterclockwise rotation of the shaft 62 will raise the cylinder 54 by means of its supporting spring 56 to properly position the end of the piston rod 60 against the flange 45 for the next unloading operation.

Depending upon the load which is being carried in the truck body, it is often found desirable to provide means to prevent the tilting of the truck chassis during the unloading process. To prevent such tilting of the chassis when a heavy load is concentrated temporarily at the rear end thereof, the chassis is provided with a pair of load supporting ground engaging shoes 72 which are pivotally supported to a plate 73 welded to the chassis 12. The shoes 72 are rigidly connected to each other by means of a rod 74 (Fig. 6) which is connected by lever 75 to the crank 77 of a transversely mounted rod 78, one end of which is bent to form an operating handle 80 which in Fig. 2, is shown in the shoe elevated position.

As seen in Figs. 2 and 3, a laterally extending bar 82 is fixed to the frame 22 adjacent the rod 78 and to act as a stop for the crank portion 77 when rotated clockwise approximately 185° from the position shown in Fig. 3. It will be readily apparent that the weight of the shoes will hold the crank member 77 against the stop rod 82 to maintain the shoes in their elevated or horizontal position during periods of nonuse. To lower the shoes, it is merely necessary to rotate the handle 80 from the position shown in Fig. 2 counterclockwise through an angle of approximately 185°.

As illustrated in Fig. 6, the dump truck body 20 is provided with latching means for the tailgate 84 which is hinged as at 85. The lower side edges of the gate are slotted to receive a pair of latch members 87 and 88 connected to the opposite ends of a bar 89 which is pivoted to the gate at 90. It will be readily apparent that rotation of the bar in a counterclockwise manner acts to withdraw the latches from engagement with the sides of the dump body 20 and vice versa. A spring 92 biases the latches outwardly in the latching position from which they are withdrawn by a pull on the handle of an operating lever 94 which rotates the rod 89 in a counterclockwise manner to withdraw the latches. The front sides of the ends of the latches are beveled so as to enable the tailgate 84 to be slammed shut when desired.

The operation of the unloading of the dump body 20 will now be described. Supposing the body to be loaded with bricks and it is desired to deposit the load in a certain spot without also unloading the body. The lever 40 is raised to unlock the body from the frame 22 on the chassis 12, air is admitted to the cylinder 54 causing the piston rod 60 to act on the flange 45 to slide the body backwardly on its runners 26 in the tracks 24 to a position where the body starts to tip. The winch and cable act to hold the truck body fast and the rear end of the body is lowered over the roller 29 (Fig. 1) until it engages the ground. The tailgate is now unlatched, the body held fast by the winch and the truck and body driven slowly out from under the load to deposit it on the ground in the same position it held in the body.

The emptied body can now be hauled back upon the frame 22 by means of the winch and cable 16 and locked thereon by means of the engagement of the rod 34 with the latches 37 and the truck driven to a different spot for purposes of unloading the body for reloading with material. In the event that it is desired to deposit the truck body 20 together with its load at any spot, the same procedure as just described is followed except that the body 20 is lowered completely to the ground without opening the tailgate, the hook 18 is thereafter detached from the ring 48 and the truck is driven off to pick up another body which may have been loaded in the meantime.

In loading a truck body upon the frame 22, the truck chassis is backed right up to the body, the hook 18 of the winch cable 16 is engaged in the body ring 48 and power is applied to the winch whereupon the guard 50 will engage the butt plate 52 and the front end of the body will continue to be raised until it rides over the roller 29. The runners 26 of the body, being guided by the flanges 30 will be properly aligned to slide in the trackways 24 on the roller 29 and immediately thereafter upon the rollers 28 while being pulled forwardly by the winch. As has been previously explained, forward motion on the body is stopped by the hooks 35 and the body is automatically latched to or locked upon the frame 22 when the rod 34 engages with the hook portions 37 of the locking arms 38.

It will thus be readily apparent that the apparatus comprising the present invention, namely, the frame 22 which can be rigidly mounted upon any truck chassis, the air cylinder mounted on the frame for inaugurating the unloading of a body from the frame, and the various members for locking and unlocking the parts as described, in combination with the cooperating runners to be mounted on the truck body, the pressure flange 45, the rods 33 and 34 and the hook 48 constitute a highly practical and efficient unitary means, as an attachment for existing vehicles, for accomplishing the stated objects. This apparatus can be readily applied to any model of truck chassis which can mount a winch ahead of the load carrying portion so that the truck and its chassis can handle several operations without being tied up for long loading and unloading periods. Obviously, any type of material may be hauled in the various types of truck bodies which may be equipped with our invention, such as sand, gravel, tile, brick, cement sacks, etc.

It is to be understood that the form of our invention herewith shown and described is to be taken as a preferred example of the same and that various changes in the shape, size and arrangement of parts may be resorted to without departing from the spirit of the invention or the scope of the appended claims.

What is claimed is:

1. A loading and unloading apparatus for vehicle bodies, said apparatus comprising a unit including a track forming frame, a pair of body supporting runners adapted to be guided by said tracks, fluid actuated means pivotally mounted to said frame for pushing the body longitudinally of the tracks, a first rod pivotally mounted on said frame and extending transversely thereof, trigger members fixed to said rod and extending upwardly adjacent said tracks, a support member fixed to said rod and extending upwardly between said tracks, resilient means depending from said support member and having supporting connection with said fluid actuated means, a second rod fixed to said runners and engageable with said trigger members to angularly elevate said fluid actuated means during the loading of a body on said frame, a hook member fixed to said first rod and adapted to receive said second rod, and an operating lever pivoted to said hook member and adapted to be latched to said frame to lock the body thereon.

2. A loading and unloading apparatus for vehicle bodies comprising a track forming frame having a pair of track forming sides, a pair of spacedly connected body supporting runners adapted to be guided by said frame, opposed rod ends extending laterally outward of the respective runners adjacent the rearward ends thereof, a rearwardly opening hook portion secured on the rearward end of each track forming side of the frame in positions to receive and retain said rod ends when the runners are in their forwardmost position relative said frame, a rod mounted between and extending transversely of the forward ends of said runners, a shaft mounted between the forward parts of said track forming sides and extending transversely thereof below the runner engaging surfaces, latching means carried on said shaft and extending upwardly of said track forming frame, said latching means being formed and arranged automatically to receive and retain the said rod when slid forwardly into engagement therewith, and a fluid actuated cylinder pivotally mounted only to the forward end of said frame and having an extending piston rod for freely abutting and pushing the body longitudinally and rearwardly of the track forming frame.

3. A loading and unloading apparatus for vehicle bodies, said apparatus comprising a unit including a track forming frame, a pair of spacedly connected body supporting runners adapted to be guided by said tracks, a first rod extending transversely between said runners adjacent the rearward ends thereof, a second rod extending transversely between said runners adjacent the forward ends thereof, a shaft mounted between the forward parts of said tracks and extending transversely thereof below the runner engaging surfaces, latching means carried on said shaft and extending upwardly of said track forming frame, fluid actuated means pivotally mounted only on said frame adjacent the forward end beneath the surface of said tracks for freely abutting and pushing the vehicle body longitudinally and rearwardly of the tracks, said latching means being formed and arranged automatically to receive and retain the second rod extending between the forward ends of the runners when slid forwardly therepast, and a rearwardly opening hook portion integrally secured on the rearward end of each track to receive and retain said first rod when the second is retained by the latching means.

4. A loading and unloading apparatus for vehicles, said apparatus comprising a track forming frame having a pair of track forming sides and adapted to be fixed to the vehicle chassis, a load carrying vehicle body, a pair of supporting runners secured to said body and adapted to be guided by said frame sides, opposed rod ends extending laterally outward of the respective runners adjacent the rearward ends thereof, a rearwardly opening hook portion secured on the rearward end of each track forming side of the frame in positions to receive and retain said rod ends when the runners are in their forwardmost position relative said frame, a rod mounted between and extending transversely of the forward ends of said runners, a shaft mounted between the forward parts of said track forming sides and extending transversely thereof below the runner engaging surfaces, latching means carried on said shaft and extending upwardly of said track forming frame, said latching means being formed and arranged automatically to receive and retain the said rod when slid forwardly into engagement therewith, a depending transverse flange member secured to the vehicle body and disposed between said runners intermediate the ends thereof, and a fluid actuated cylinder pivotally mounted only to the forward end of said frame and having an extending piston rod for freely abutting said flange member and pushing the body longitudinally and rearwardly of the track forming frame.

5. A loading and unloading apparatus for vehicles provided with a windlass and cable, said apparatus comprising a unit including a track forming frame having a pair of track forming sides and adapted to be fixed to the vehicle chassis, a load carrying vehicle body, runners fixed in spaced relation on the underside of the vehicle body and adapted to be guided by the track forming sides of said frame, cable connecting means on the forward end of said vehicle body, oppositely disposed rollers journaled in the forward parts of the respective track forming sides of said frame to engage and support said runners within said frame, a shaft mounted in fixed position between the rearward ends of the track forming sides of said frame, a split roller journaled on and extending across the shaft with the top of said roller arranged to define with said forward rollers a common plane supporting said runners within said frame, and a butt plate extending across the rear end of said frame and depending therefrom in approximate vertical alignment with the rearward side of said split roller.

6. A loading and unloading apparatus for vehicles provided with a windlass and cable, said apparatus comprising a unit including a rectangular track forming frame adapted to be fixed to the vehicle chassis, a load carrying vehicle body, runners fixed in spaced relation on the underside of the vehicle body and adapted to be guided by the track forming sides of said frame, cable connecting means centrally disposed on the forward end of said vehicle body, oppositely disposed rollers journaled in the forward parts of the respective track forming sides of said frame to engage and support said runners within said frame, a shaft mounted in fixed position between the rearward ends of the track forming sides of said frame, a split roller journaled on and extending across the shaft with the top of said roller arranged to define with said forward rollers a common plane supporting said runners within said frame, said split roller being formed with a central pair of cable guiding flanges and a runner guiding flange on each end portion, and a butt plate extending across the rear end of said frame and depending therefrom in approximate vertical alignment with the rearward side of said split roller.

7. A loading and unloading apparatus for vehicle bodies, said apparatus comprising a unit including a track forming frame, a pair of body supporting runners adapted to be guided by said tracks, a fluid actuated cylinder pivotally mounted only to said frame and having an extending piston rod with a free end for abutting and pushing the body longitudinally and rearwardly of the tracks, a shaft pivotally mounted on said frame and extending transversely thereof, a trigger member fixed to said shaft and extending upwardly adjacent said tracks, a support member fixed to said shaft and extending between said tracks in crank angle relation to the trigger member, resilient means depending from said support member and having supporting connection with said fluid actuated cylinder, and a rod fixed between the forward ends of said runners and progressively engageable with said trigger member to change the working angle of said fluid actuated cylinder during the loading of a body on said frame.

8. A loading and unloading apparatus for vehicles provided with a windlass and cable, said apparatus comprising a unit including a rectangular track forming frame having a pair of track forming sides and adapted to be fixed to the vehicle chassis, a load carrying vehicle body, a spaced pair of supporting runners secured to said body and adapted to be guided by said frame sides, opposed rod ends extending laterally outward of the respective runners adjacent the rearward ends thereof, a rearwardly opening hook portion secured on the rearward portion of each track forming side of the frame in positions to receive and retain said rod ends when the runners are in their forwardmost position relative said frame, cable connecting means on the forward end of said vehicle body, a fluid actuated cylinder pivotally mounted only to the forward end of said frame and having an extending piston rod with a free end for abutting and pushing the body longitudinally and rearwardly of the track forming frame, a shaft pivotally mounted on said frame and extending transversely thereof, a trigger member connected with said shaft to rotate the same and extending upwardly between said track forming sides, means supporting the pivotally mounted cylinder, said supporting means including a crank member connected to said shaft for rotation therewith and extending between said track forming sides, and a rod fixed transversely between the forward end portions of said track forming sides and progressively engageable with said trigger member to change the working angle of said fluid actuated cylinder during the loading of a vehicle body on said frame.

THOMAS A. WYATT.
COLLIE C. WYATT.
RUE T. WYATT.

REFERENCES CITED

The following references are of record in the file of this patent:

UNITED STATES PATENTS

| Number | Name | Date |
|---|---|---|
| 1,404,069 | Swinehart | Jan. 17, 1922 |
| 1,567,478 | Vonnez et al. | Dec. 29, 1925 |
| 1,870,573 | Kuchar | Aug. 9, 1932 |
| 1,885,399 | Wren | Nov. 1, 1932 |
| 2,189,052 | Anthony | Feb. 6, 1940 |
| 2,216,972 | Gibson et al. | Oct. 8, 1940 |
| 2,470,360 | Messick | May 17, 1949 |